United States Patent [19]
Lin

[11] 3,716,616
[45] Feb. 13, 1973

[54] PROCESS FOR DECONTAMINATION OF NEUTRON-IRRADIATED BERYLLIUM

[75] Inventor: Kuang-Hui Lin, Oak Ridge, Tenn.

[73] Assignee: The United States of America as represented by the United States Atomic Energy Commission

[22] Filed: Feb. 24, 1971

[21] Appl. No.: 118,494

[52] U.S. Cl. .................... 423/134, 423/89, 423/111, 423/495, 203/31, 203/29
[51] Int. Cl. .................................................. C01f 3/00
[58] Field of Search ..... 23/17, 21, 24 B, 87; 423/134, 423/111, 495

[56] References Cited

UNITED STATES PATENTS 3,146,066   8/1964   Bach....................................23/17 X

FOREIGN PATENTS OR APPLICATIONS 760,217   10/1956   Great Britain........................23/24 B

*Primary Examiner*—Herbert T. Carter
*Attorney*—Roland A. Anderson

[57] ABSTRACT

A process for treating neutron-irradiated beryllium containing cobalt-60 is provided which comprises reacting the beryllium with molten stannous chloride under conditions which will produce beryllium chloride and subsequently distilling the beryllium chloride to recover a decontaminated beryllium chloride distillate.

2 Claims, No Drawings

PROCESS FOR DECONTAMINATION OF NEUTRON-IRRADIATED BERYLLIUM

DESCRIPTION OF THE INVENTION

The invention described herein was made in the course of, or under, a contract with the U. S. Atomic Energy Commission.

The present invention relates to a process for decontaminating neutron-irradiated beryllium. More particularly, it is concerned with a process for separating beryllium from cobalt-60.

Beryllium may be used as a moderator or reflector in element, alloy, or compound form in various nuclear reactors. When it is used for this purpose, or others where it experiences neutron irradiation, it becomes contaminated with a number of radioactive species, the worst of which is cobalt-60. If the neutron-irradiated beryllium is to be used outside the reactor, it should, in the most preferred condition, be decontaminated from its cobalt-60 content. It is, accordingly, an object of this invention to provide a process to achieve this preferred condition. More particularly, it is an object of this invention to provide a process which will reduce the radioactivity of neutron-irradiated beryllium to a level which allows it to be handled such that the hazard from radioactivity is no greater than the chemical toxicity of beryllium. It is another object of this invention to provide a method for decontamination of neutron-irradiated beryllium with respect to the radioactive impurity cobalt-60. A further object of the invention is to provide a simple, rapid, economic, and efficient method for separating beryllium from cobalt-60 contamination.

The objects of this invention are realized by reacting neutron-irradiated beryllium in element, compound, or alloy form with molten stannous chloride to convert the beryllium to beryllium chloride and then distilling the reaction mixture to obtain a distillate consisting of a purified beryllium chloride product decontaminated from cobalt. The process of this invention is characterized by its simplicity and ease of operation. It is simple because both the conversion of beryllium and its subsequent separation by distillation can be carried out in the same reaction vessel. Moreover, the separation process can be conducted on a virtually continuous basis, requiring only the use of a single, relatively inexpensive reagent (stannous chloride) and a relatively inexpensive apparatus involving a reaction vessel coupled to a distillation column which allows recovery of a purified beryllium chloride distillate.

In actual practice, the process is conducted on an essentially two-stage sequence. Finely divided particles (in the size range 0.2 mm to 2 mm) are mixed with a quantity of stannous chloride in a reaction vessel made of quartz or nickel. A stream of inert gas is passed over the mixture to prevent subsequent air oxidation of the beryllium. The mixture is heated to the melting point of stannous chloride whereupon an exothermic reaction takes place, represented by the equation $$Be + SnCl_2 \rightarrow BeCl_2 + Sn.$$

This reaction is fairly exothermic and can be controlled by regulating the initial beryllium-to-stannous chloride mole ratio as well as by a controlled program of externally applied heat. In general terms, it is preferred to operate at an initial beryllium-to-stannous chloride mole ratio in the range of about 0.2 to 1.0, which range, it has been found, will effect conversion of beryllium to beryllium chloride within a relatively short time. As the reaction proceeds, one can discern the development of three distinct phases: a single solid phase consisting of beryllium and two liquid phases, an upper liquid phase consisting of beryllium chloride and stannous chloride and a lower intermediate phase containing liquid tin. It is preferred to conduct the reaction by continually sparging an inert gas such as argon through the reaction mixture to promote agitation. The sparging gas serves as a convenient carrier to remove beryllium vapor and also serves as a convenient inert blanket against oxidation of beryllium.

The fairly rapid kinetics of the conversion of beryllium to beryllium chloride can be realized by an examination of the following table.

TABLE I

[Composition of $SnCl_2$-Be reaction mixture and beryllium conversion as functions of time]

| Elapsed time (t),[a] min. | Temperature, °C. | Be content of melt, weight percent | Amounts of reactants remaining,[b] moles | | Cumulative amount of $BeCl_2$ formed,[b] moles | Conversion of Be,[b] percent |
|---|---|---|---|---|---|---|
| | | | Be | $SnCl_2$ | | |
| | | Be/$SnCl_2$ mole ratio=0.42 | | | | |
| 16 | 245 | 1.11 | 0.114 | 0.418 | 0.108 | 48.8 |
| 27 | 298 | 1.58 | 0.075 | 0.380 | 0.147 | 66.1 |
| 38* | 293 | 1.84 | 0.055 | 0.360 | 0.167 | 75.0 |
| 58 | 293 | 1.90 | 0.051 | 0.356 | 0.171 | 77.0 |
| 74 | 303 | 1.93 | 0.049 | 0.354 | 0.173 | 77.9 |
| | | Be/$SnCl_2$ mole ratio=0.21 | | | | |
| 11 | 290 | 0.56 | 0.106 | 0.938 | 0.116 | 52.3 |
| 16 | 305 | 0.76 | 0.068 | 0.900 | 0.154 | 69.4 |
| 21* | 310 | 0.83 | 0.055 | 0.887 | 0.167 | 75.2 |
| 32 | 383 | 0.84 | 0.053 | 0.885 | 0.169 | 76.0 |
| 58 | 407 | 0.87 | 0.017 | 0.879 | 0.174 | 78.5 |
| 89 | 410 | 0.89 | 0.044 | 0.876 | 0.178 | 80.1 |

[a] t=0 when the reaction begins near the melting point of $SnCl_2$.
[b] Calculated data.
*Transition point.

According to the table, it is seen that the reaction is 50–60 percent complete in about 15 minutes at temperatures near the melting point of stannous chloride. It is seen that the reaction rate is quite favorable at low beryllium-to-stannous chloride mole ratios and, while higher ratios may be used, there is no discernable practical benefit in doing so.

Once the beryllium has been converted to beryllium chloride, as shown from the data in the table above, the reaction mixture is heated to a temperature in the range 400°–700° C. whereupon the beryllium chloride will be selectively distilled, allowing recovery of a product decontaminated from cobalt. Examination of a number of beryllium chloride distillates of beryllium and stannous chloride shows that decontamination factors in the range 200 to in excess of 40,000 can be achieved, depending upon the initial cobalt content in the beryllium feed mixture. Representative data illustrating the degree of decontamination achievable by the process of this invention are given in Table II below.

TABLE II

Decontamination Factor for $BeCl_2$ Products from $SnCl_2$-Be (nonradioactive) Process

| Mole Ratio $Be/SnCl_2$ | Initial Co Content Based on Be, parts per million | Decontamination Factor (with respect to Co) |
|---|---|---|
| 0.42 | 425 | 210 |
| 0.42 | 1,100 | 1,220 |
| 1.06 | 110 | 110–275 |
| 1.06 | 20,400–32,400 | 20,400–40,800 |

The decontamination factor is defined as the cobalt content in the reaction mixture divided by the cobalt content in the beryllium chloride distillate.

The data in Table II show that the degree of decontamination is a function of the initial cobalt content. It therefore suggests itself that, where maximally high decontamination factors are desired or needed, it may be an appropriate measure to spike the initial feed mixture with nonradioactive cobalt.

In order to convert the decontaminated beryllium chloride distillate into elemental form, it can be electrolytically refined by selective deposition from an anhydrous molten alkali metal electrolyte by electrolytic refining at a temperature in the range 400–600°C. From molten bath containing, for example, lithium chloride, potassium chloride, and beryllium chloride mixture, beryllium of even higher purity can be obtained.

It is thus seen that there has been described a method for the decontamination of neutron-irradiated beryllium which allows it to be reprocessed either for reuse in a reactor or for other suitable purposes under conditions which the radiological health hazard resulting from its contamination with cobalt-60 is avoided.

What is claimed is:

1. A process for treating neutron-irradiated beryllium containing cobalt-60 which comprises reacting the beryllium with molten stannous chloride at a $Be/SnCl_2$ mole ratio in the range 0.2 to 1.06 under conditions which will produce beryllium chloride and subsequently distilling the beryllium chloride at a temperature in the range 400°–700° C. to recover a decontaminated beryllium chloride distillate.

2. The process according to claim 1 wherein the beryllium-to-stannous chloride mole ratio is in the range 0.2 to 1.0.

* * * * *